No. 622,147. Patented Mar. 28, 1899.
S. HILLER.
STUMP EXTRACTOR.
(Application filed July 5, 1898.)
(No Model.) 2 Sheets—Sheet 1.
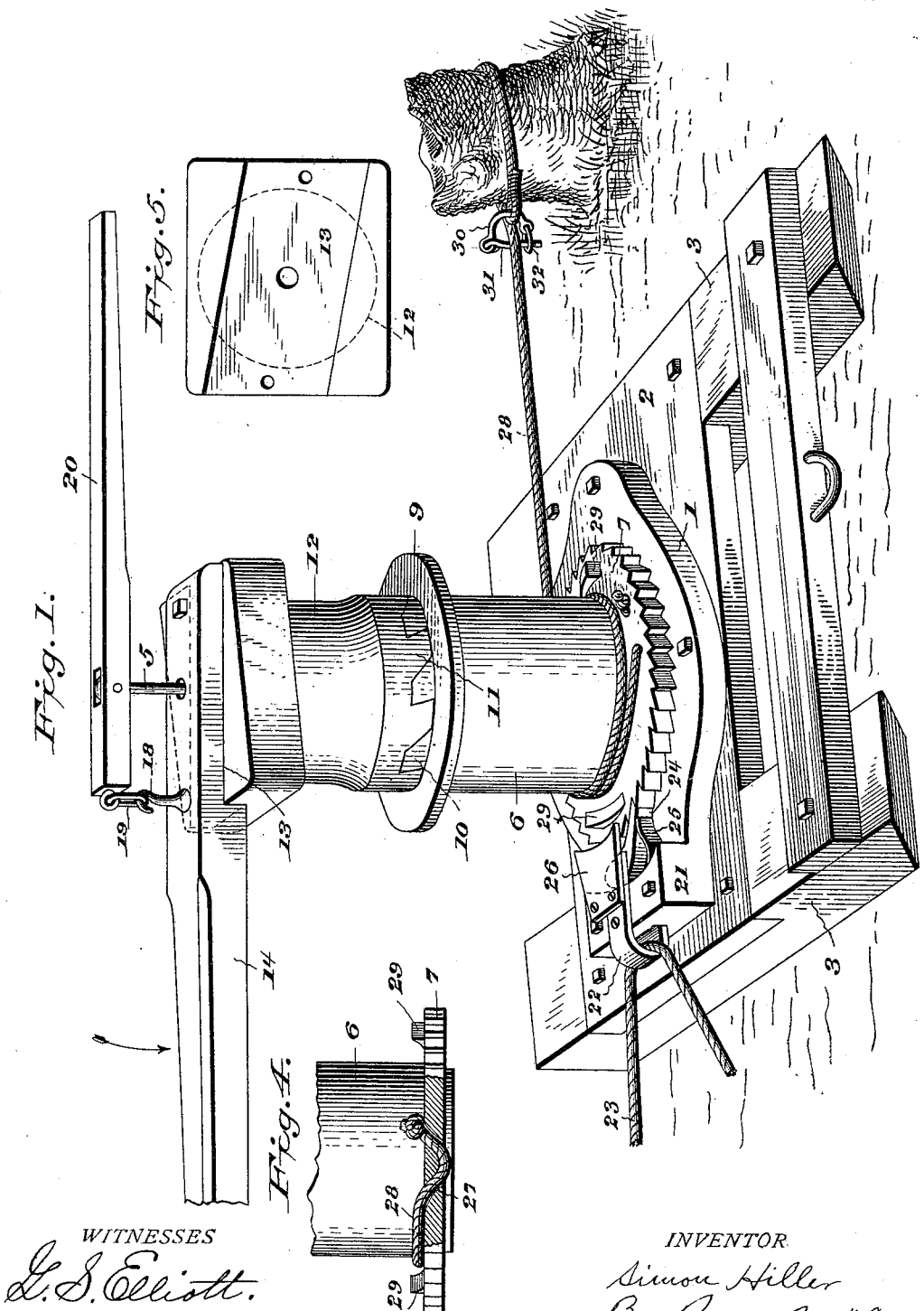
WITNESSES
L. S. Elliott.
J. R. Ireland.
INVENTOR
Simon Hiller
By Percy B. Hills
Attorney
THE NORRIS PETERS CO., PHOTO-LITHO., WASHINGTON, D. C.

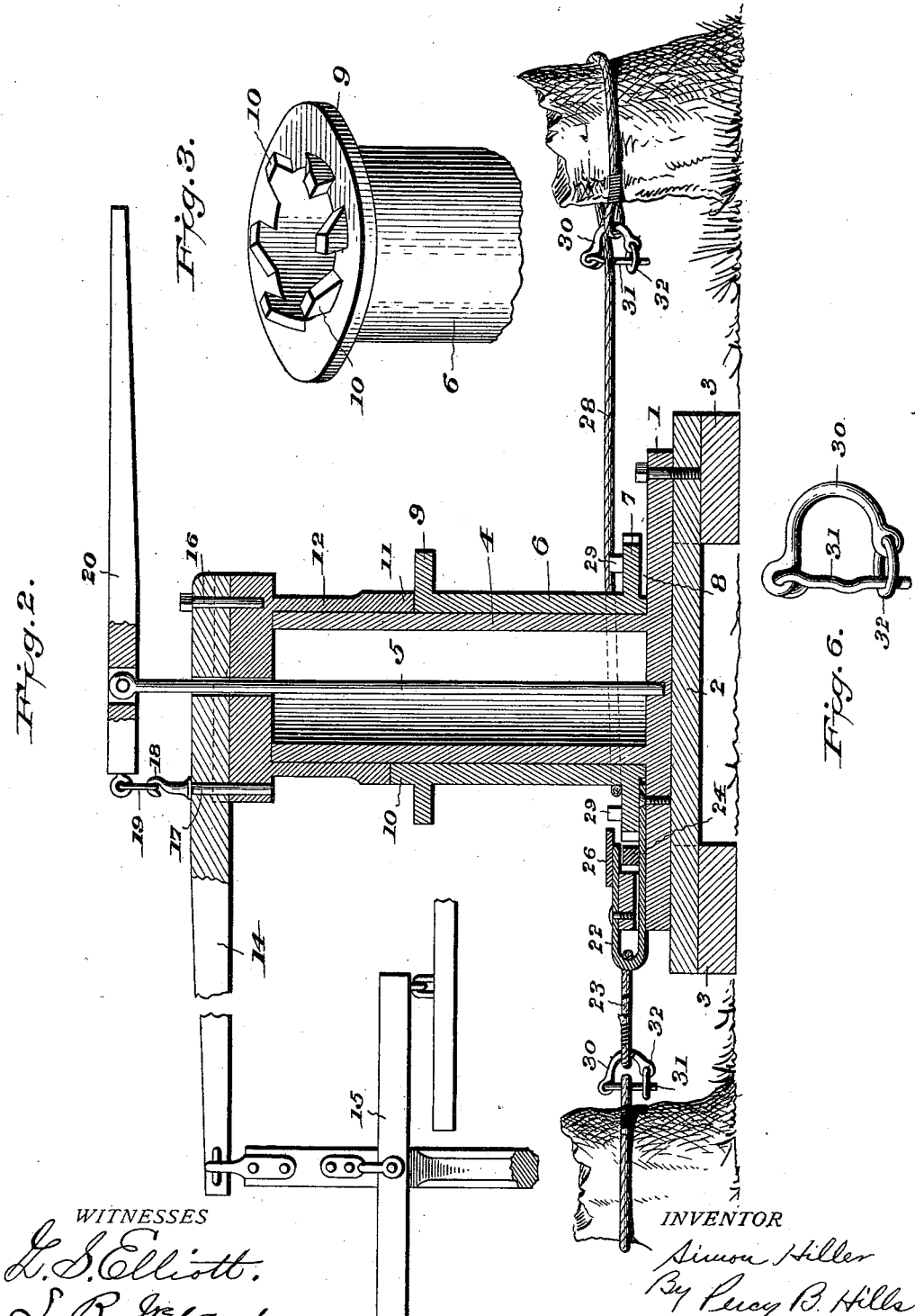

UNITED STATES PATENT OFFICE.

SIMON HILLER, OF CARBONDALE, ILLINOIS.

STUMP-EXTRACTOR.

SPECIFICATION forming part of Letters Patent No. 622,147, dated March 28, 1899.

Application filed July 5, 1898. Serial No. 685,080. (No model.)

*To all whom it may concern:*

Be it known that I, SIMON HILLER, a citizen of the United States, residing in Carbondale, in the county of Jackson, State of Illinois, have invented certain new and useful Improvements in Stump-Extractors, of which the following is a specification.

My invention relates to devices for extracting stumps from the ground, and has for its object to provide a construction that is comparatively simple and durable in construction, very effective in operation, and arranged to extract large and heavy stumps with a minimum expenditure of power.

The invention consists in certain parts and details and combinations of the same, as will be hereinafter fully described and then pointed out in the claims.

Referring to the accompanying drawings, Figure 1 is a perspective view of my improved stump-extractor. Fig. 2 is a central vertical sectional view of the same. Fig. 3 is a detail perspective view of the top portion of the winding-drum. Fig. 4 is a detail side elevation of the lower portion of the winding-drum, the ratchet-flange forming part thereof being shown partly in section. Fig. 5 is a detail top plan view of the clutch member. Fig. 6 is a detail view of the hitch-link.

Similar numerals of reference denote corresponding parts in the several views.

In the said drawings the reference-numeral 1 denotes the base of the device, the same being firmly bolted to a frame 2, mounted on suitable runners 3, as shown. Formed integral with and rising from the base 1 is a capstan 4, while rotatably mounted in said base centrally of said capstan is a vertical rod 5, the same projecting some distance above said capstan, for a purpose hereinafter to be described. Carried by said capstan, but freely rotatable thereon, is a drum 6, the same being provided with a circumferential flange 7 at its bottom, toothed on its periphery and undercut or recessed at 8, for a purpose hereinafter to be described. Said drum is also provided at its upper end with a flange 9, the same having formed on its upper surface a series of teeth 10, adapted to engage with similar teeth 11, formed in the lower edge of a clutch member 12, that fits onto the upper end of the capstan 4 and is also rotatable thereon. The upper closed end of this clutch member 12 is centrally apertured for the free passage of the rod 5 and, as seen in Fig. 5, is provided on its top surface with a diagonally-placed channel 13, adapted to snugly receive the inner end of a sweep 14, that has connected thereto at its outer free end a suitable draft mechanism—for instance, a doubletree 15, as shown in Fig. 2. Said sweep 14 is also apertured for the free passage of the rod 5 and is fixed to the clutch member 12 by means of bolts 16 and 17, the latter projecting into a hook 18, adapted to be detachably engaged with a link 19, carried by the short arm of a lifting-lever 20, that is pivoted intermediate its length to the rod 5.

The base 1 of the device is provided at one side with an enlargement 21, that is apertured to receive the lower arm of a U-shaped strap 22, bolted thereto and adapted to receive the anchor-cable 23. Mounted on the base 1 intermediate the enlargement 21 and the toothed flange 7 of the drum 6 is a pawl 24, normally retained in engagement with the teeth of flange 7 by a spring 25, as shown. Bolted to the upper surfaces of the enlargement 21 and strap 22 is a plate 26, the same projecting somewhat over the flange 7 and serving to retain the drum 6 against accidental vertical displacement.

As shown more particularly in Fig. 4, the flange 7 is provided with a reëntrant aperture 27, adapted to receive one end of the pulling-cable 28, the same being passed down into one end of the same and out through the other end, where it is knotted to prevent its withdrawal. The said flange 7 is also provided on its upper surface with a series of cams 29, serving as rope-guides.

I have shown in Fig. 6 a preferred form of hitch-link for the anchor and pulling cables, the same consisting of a U-shaped member 30, carrying at one end a bar 31, adapted to be detachably engaged by a link 32, carried by the other end of said U-shaped member 30.

From the above description the operation of my improved construction will be understood to be as follows: The device is located between the stump to be pulled and a suitable anchor-stump, and the anchor-cable 23 is passed around said anchor-stump and through the loop of the strap 22, its ends being engaged with the U-shaped member 30 and the bar 31 of one of my improved hitch-links, the result being that when said bar is engaged by the link 32, as shown in Fig. 2, the ends of said cable will be held firmly together. The pulling-cable 28 is then attached at one end to the flange 7 of the drum 6, as shown in Fig. 4 and hereinbefore described, then passed around said drum, then around the stump to be extracted, where its other end is engaged with the U-shaped member 30 of a hitch-link hereinbefore described, the bar 31 of said hitch-link being then engaged with said cable just in front of where it passes around the stump, and being in turn engaged by the link 32, the whole forming a firm connection, as shown in Fig. 2. Power being now applied to the sweep 14 in the direction of the arrow, Fig. 1, the clutch member 12 will be rotated and, through the engagement of its teeth 11 with the teeth 10 of the drum 6, will rotate the latter and wind up the cable 28 thereon, said cable being guided in its initial winding by the cam-surfaces 29, thus affording the power necessary to extract the stump from the ground. When it is desired to unwind the cable 28, it is only necessary to throw the pawl 24 out of engagement with the toothed periphery of flange 7 and to bear down upon the outer end of lever 20, the latter resulting, through the engagement of its short arm with the hook 18, in bodily raising the clutch member 12 until its teeth 11 are out of engagement with the teeth 10 of the drum 6, thus permitting a reverse rotation of said drum and the consequent unwinding of the cable 28. All the parts can be removed from the capstan 4 by first removing the plate 26.

It will be observed that the under side of flange 7 is circumferentially recessed at 8, thus leaving a small bearing-surface of said flange on the base 1 and at the same time permitting the projection of the lower arm of strap 22 beyond the enlargement 21, whereby a screw may be passed therethrough to retain the same in position.

Referring to Fig. 5, it will be seen that the channel 13 in the clutch member 12, which snugly receives the sweep 14, is located diagonally therein, the object being to provide thickened side walls for said channel at the two points where the greatest strain of the sweep comes.

Having thus described my invention, what I claim as new, and desire to secure by Letters Patent, is—

1. In a stump-extractor, the combination with a suitable supporting-frame, a base mounted thereon, a capstan rising from said base, a drum rotatably mounted on said capstan, a clutch member also mounted on said capstan above said drum and adapted to engage with the latter, and a sweep engaged with said clutch member, of a rod rotatably mounted in said base and projecting centrally through said capstan, drum, clutch member and sweep, and a lever pivoted intermediate its length to said rod and engaged at one end with the clutch member for raising and lowering the latter with respect to the drum, substantially as set forth.

2. In a stump-extractor, the combination with a suitable supporting-frame, a base mounted thereon, a capstan rising from said base, a drum rotatably and removably mounted on said capstan, a clutch member also removably mounted on said capstan above said drum and adapted to engage with the latter, and a sweep engaged with said clutch member, of a rod rotatably and removably mounted in said base and projecting centrally through said capstan, drum, clutch member and sweep, a lever pivoted intermediate its length to said rod, and a link at one end of said lever adapted to detachably engage with the clutch member for raising and lowering the latter with respect to the drum, all of said parts adapted to be removed from the capstan, substantially as set forth.

3. In a stump-extractor, the combination with a drum, and means for rotatably supporting the same, of a clutch member in rotatable engagement with said drum and having in its top surface a diagonally-arranged channel, and a sweep adapted to snugly fit into said channel, whereby a rotary movement may be imparted to said clutch member and drum, substantially as set forth.

4. In a stump-extractor, the combination with a suitable supporting-frame, a base mounted thereon and having an enlargement at one side thereof, a capstan rising from said base, a drum rotatably mounted on said capstan and provided with a flange at its bottom having ratchet-teeth on its periphery, and means for rotating said drum, of a U-shaped strap having one arm passing through an aperture in the enlargement on the base and bolted to said base to which the anchor-cable may be fastened, a spring-pressed pawl on said base adapted to engage the teeth of the drum-flange, and a removable plate on said base overlying said drum-flange for preventing accidental vertical displacement of the latter, substantially as set forth.

5. In a stump-extractor, a winding-drum provided with a flange at its bottom, said flange having a reëntrant aperture therein for the reception of the winding-cable, and having a series of cable-guiding cams on its top surface, substantially as set forth.

6. In a stump-extractor, the combination with a winding-drum, means for rotating the same, and the anchor and pulling cables, of hitch-links interposed in said cables and consisting each of a U-shaped member, a bar attached to one end of said member, and a link attached to the other end of said member and adapted to detachably engage with the free end of said bar, substantially as set forth.

In testimony whereof I have hereunto set my hand in the presence of two subscribing witnesses.

SIMON HILLER.

Witnesses:
JOHN H. JENKINS,
R. E. RENFRO.